Figure 1:
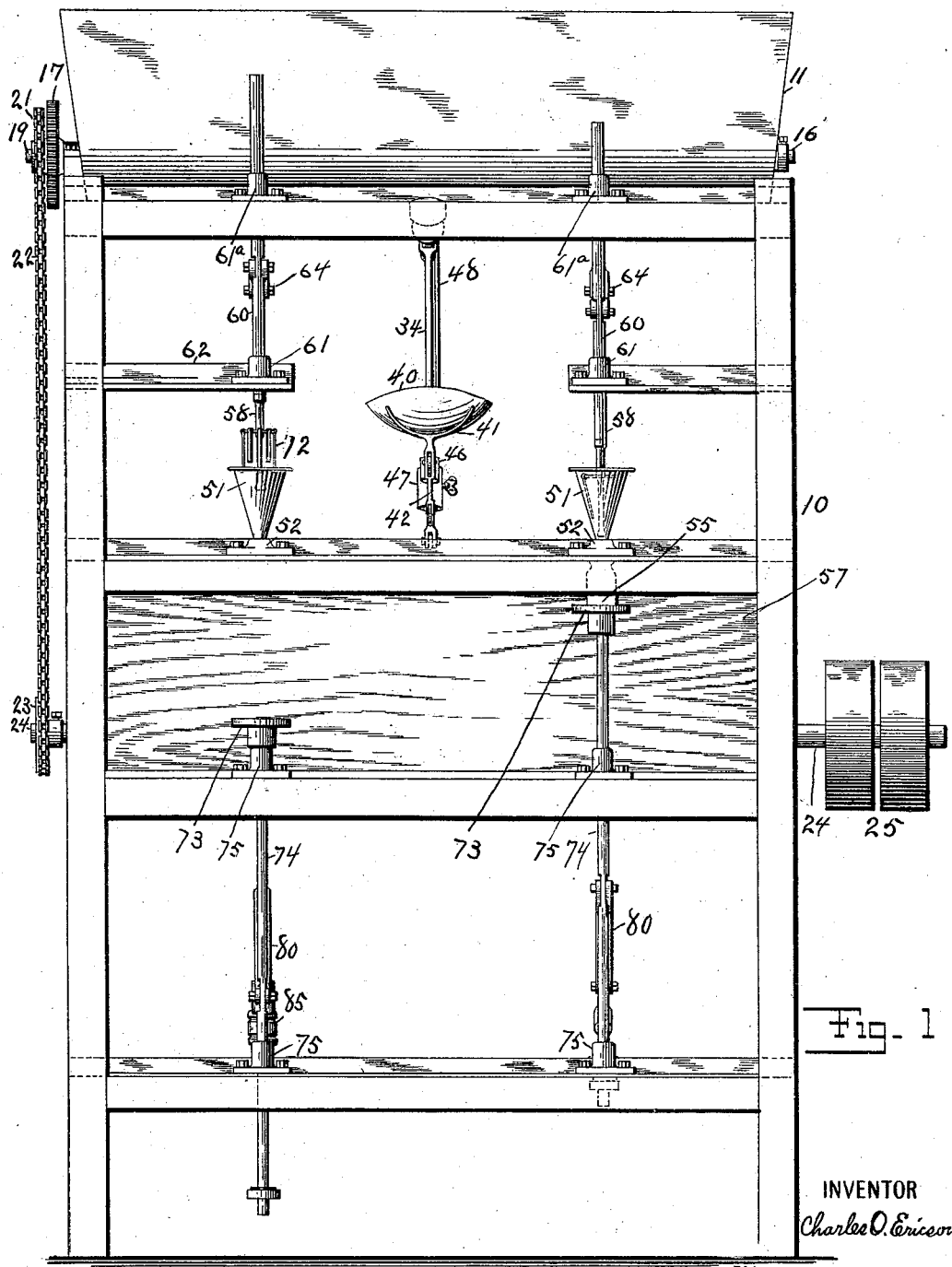

No. 691,536. Patented Jan. 21, 1902.
C. O. ERICSON.
WEIGHING MACHINE.
(Application filed June 7, 1901.)

(No Model.) 3 Sheets—Sheet 1.

WITNESSES
INVENTOR
Charles O. Ericson
BY
W. P. Hutchinson.
ATTORNEY

No. 691,536. Patented Jan. 21, 1902.
C. O. ERICSON.
WEIGHING MACHINE.
(Application filed June 7, 1901.)
(No Model.) 3 Sheets—Sheet 2.
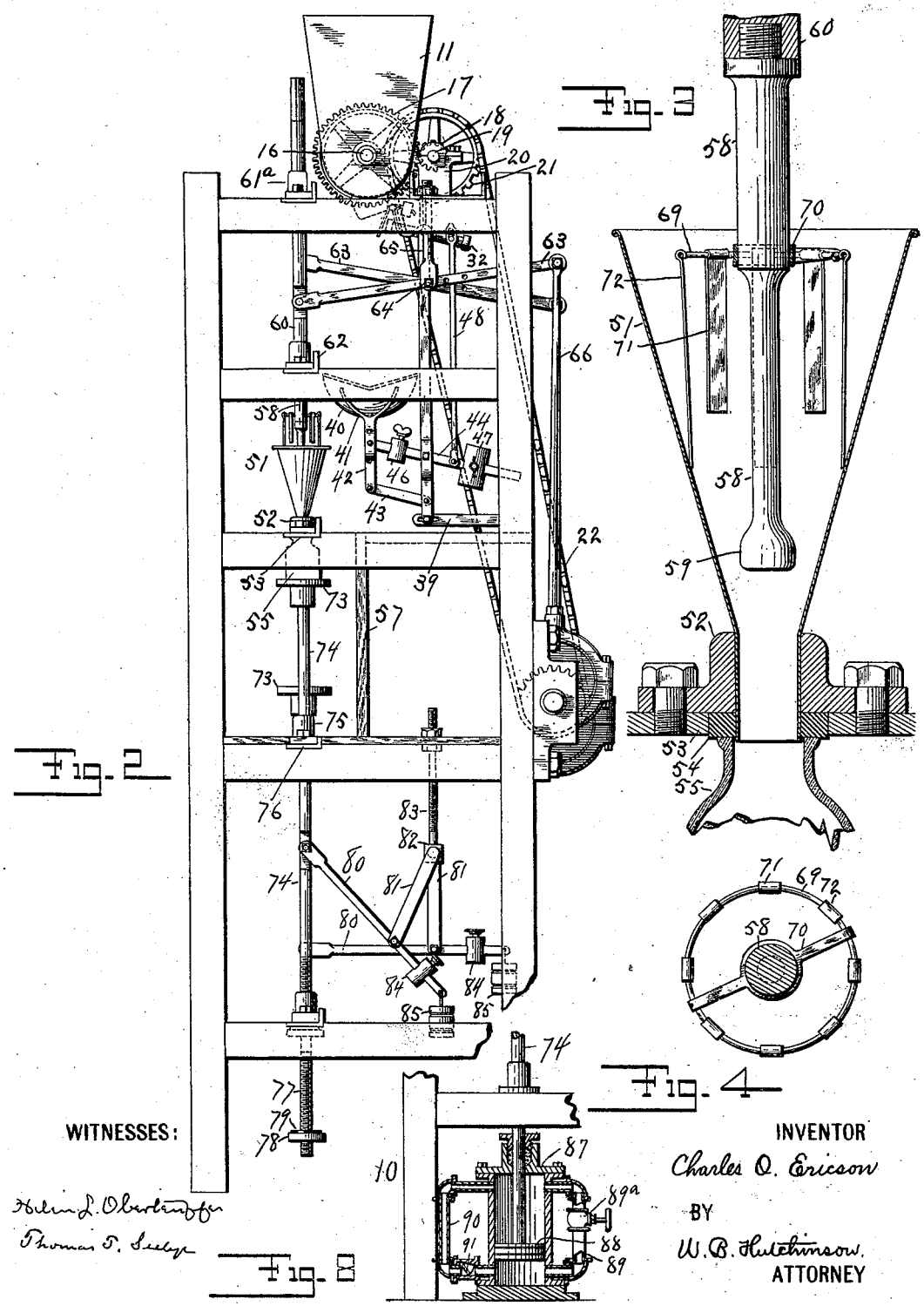
WITNESSES:
Helen L. Oberlander
Thomas T. Seelye
INVENTOR
Charles O. Ericson
BY
W. B. Hutchinson.
ATTORNEY

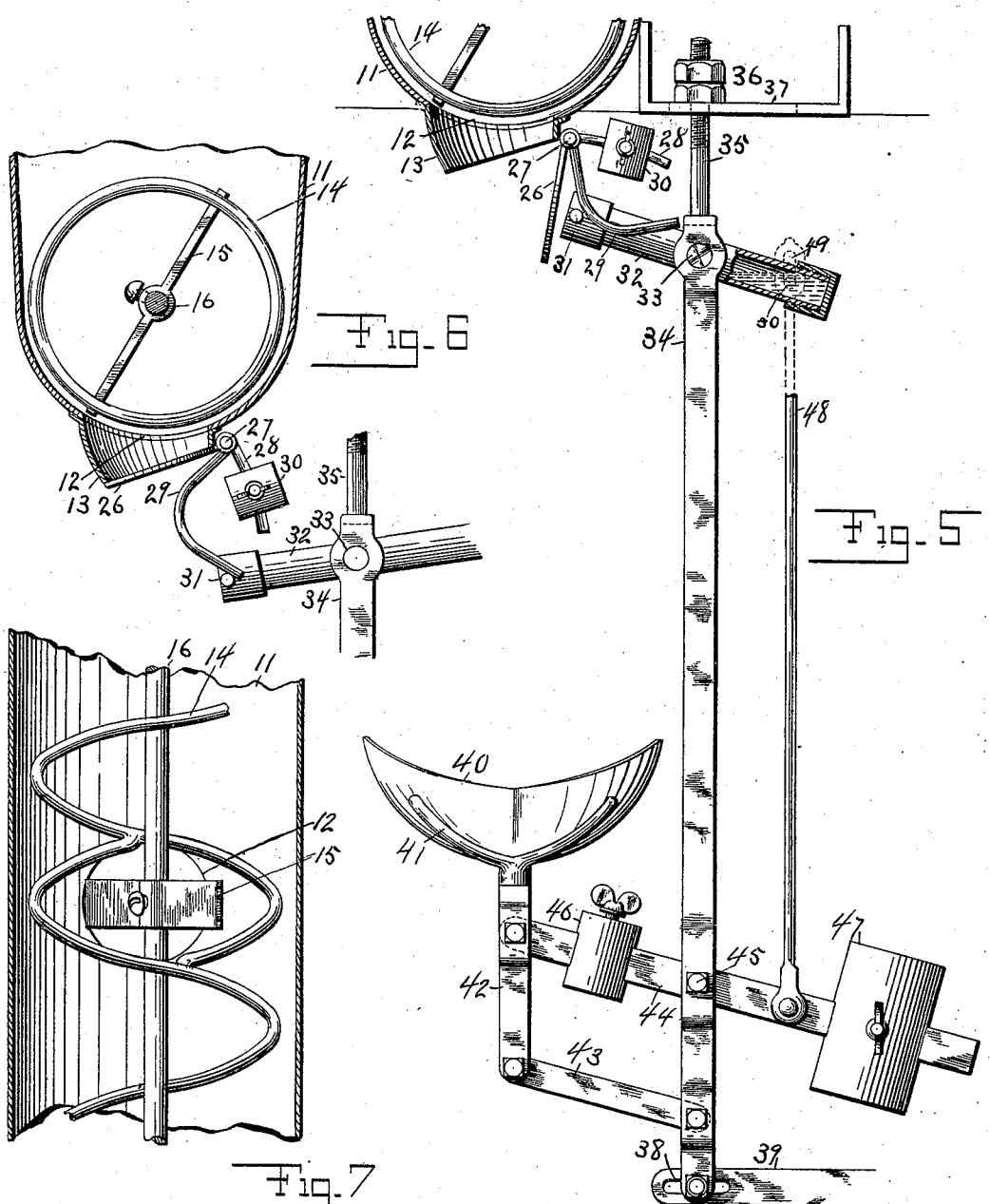

UNITED STATES PATENT OFFICE.

CHARLES OSCAR ERICSON, OF HELMETTA, NEW JERSEY.

WEIGHING-MACHINE.

SPECIFICATION forming part of Letters Patent No. 691,536, dated January 21, 1902.

Application filed June 7, 1901. Serial No. 63,538. (No model.)

*To all whom it may concern:*

Be it known that I, CHARLES OSCAR ERICSON, of Helmetta, in the county of Middlesex and State of New Jersey, have invented certain new and useful Improvements in Weighing-Machines, of which the following is a full, clear, and exact description.

My invention relates to improvements in that class of machines which are used for weighing and packing loose material into bottles, boxes, or other packages; and the object of my invention is to produce a simple and positive machine which is particularly adapted for use in weighing and packing damp powders or fibrous materials, such as snuff, which can also be used for weighing and packing similar things and which is adapted to automatically deliver the snuff or other material to a weighing-scale and successively weigh charges sufficient to fill certain sizes of package.

It is my practice to use my weighing device in connection with a machine for packing the material in bottles or other articles, and for this reason I have shown it in connection with such a machine, although the packing part of the apparatus illustrated is covered by a separate application, Serial No. 65,635, filed July 25, 1901.

To these ends my invention consists of certain features of construction and combinations of parts, which will be hereinafter described and claimed.

Reference is to be had to the accompanying drawings, forming part of this specification, in which similar figures of reference refer to similar parts throughout the several views.

Figure 1 is a front elevation of the machine embodying my invention. Fig. 2 is a side elevation or end view thereof. Fig. 3 is an enlarged detail sectional view of one of the charging-funnels and the hammer and scraper attachment therefor. Fig. 4 is a sectional plan of the hammer and scraper. Fig. 5 is an enlarged detail side elelation, partly in section, of the weighing apparatus. Fig. 6 is a detail sectional view showing the discharge mechanism of the main hopper. Fig. 7 is a broken plan view of the hopper and its contained conveyer, and Fig. 8 is a detail sectional view of an attachment which can be used when large boxes are to be packed.

The machine has a suitable framework 10, which may be of any approved design, and on this, preferably at the top, is supported a hopper 11, the bottom of which is practically horizontal, and the hopper has in the bottom an opening 12, which for convenience is placed at a point near the center of the hopper. This opening discharges into and through a short spout 13, the closure of which is automatically operated, as hereinafter described.

Within the hopper 11, which has a rounding bottom, (see Fig. 6,) is a conveyer 14, which is preferably made of spiral wire and which is carried by a shaft 16, and which when revolved has a tendency to lighten up the material and at the same time force it toward the opening 12, through which it drops.

The machine is primarily designed for packing snuff, and this is usually a little damp and sticky, and so a paddle 15 is used, which is attached to the shaft 16 and turns above and opposite the opening 12, so that when the shaft revolves the paddle has a tendency to force the snuff through the opening.

The conveyer can obviously be turned in any usual mechanical way, but as illustrated the shaft 16 projects through the ends of the hopper 11 and carries a gear-wheel 17, (see Fig. 2,) which meshes with and is driven by a pinion 18 on the counter-shaft 19, the latter being supported in a suitable pillow-block 20 and having thereon a driving sprocket-wheel 21, which is driven by a chain 22, connecting with the sprocket-wheel 23 on the main shaft 24. The driving-shaft 24 is mounted in suitable supports and is provided with driving-pulleys 25, (see Fig. 1,) one being tight and the other loose; but obviously any suitable means can be employed for turning the shaft.

The discharge-spout 13 of the hopper is provided with a swinging door 26, which is hinged to one side of the spout, as shown at 27, and which is adapted to close the spout, so as to prevent the snuff or other material from dropping therefrom. This door is provided with two arms 28 and 29, which project from the ear of the hinge 27, one arm 28 being provided with a suitable counterweight 30, adapted to normally close the door, and the second arm 29 being curved, as shown in Fig. 6, to give it a cam effect, and this arm extends into the path of a stud 31 on the tube 32, which tube acts as a controller for the door, so as to hold it open until a certain amount of snuff has been discharged and then permit the door to close. The tube 32 is closed at both ends and is pivoted near the center, as shown at 33, to a standard 34, which may be any convenient support, but which, as illustrated, is connected at the upper end to a bolt 35, and this is held by nuts 36 to a bracket-plate 37, while at the lower end the standard 34 is adjustably secured in the slots 38 of the arm 39, and this is fastened to the main frame 10, as shown in Fig. 2. The tube 32 contains a heavy liquid, mercury being suitable, which will run from end to end of the tube and which, consequently, will tip down first one end and then the other of the tube, according to circumstances, as will presently appear.

The material discharged from the spout 13 falls into the pan 40 of a scale, the pan being supported in the forks 41, as usual, although any convenient means can be substituted for supporting the pan. The forks 41 are carried by a rod 42, which is held in a vertical position and is at its lower end pivotally connected, by means of the link 43, with the standard 34, while farther up the rod 42 is pivoted to the weighing-lever 44, and this is fulcrumed, as shown at 45, on the standard 34 and is provided with the weights 46 and 47, these being disposed on opposite sides of the standard and being adjustable on the weighing-lever, so that by means of the weights the scale can be adapted to weigh any desired amount of material within certain limits. The weighing-lever 44 is pivoted to a rod 48, which at the upper end is formed into an eye 49, which engages a stud 50 (see Fig. 5) on an end portion of the door-controlling tube 32.

Referring to Fig. 5, it will be seen that the operation of the weighing apparatus is as follows: The scale being pushed up to the position shown, the weight 47 will drop and one end of the controlling-tube 32 will be depressed, so that the mercury will run into the depressed end and hold the tube in this position. The tilting of the tube brings the stud 31 into contact with the arm 29 of the door 26 and so opens the door against the tension of the weight 30. In this connection it will be observed that there is a certain amount of lost motion in the rod connection between the weighing-arm 44 and the controlling-tube 32, so that the tube is not moved and the door 26 opened until the scale-pan 40 is up to place. The door 26 being opened, as described, the snuff or other material runs through into the pan 40 until a sufficient quantity has fallen, at which time the weight of the snuff overbalances the weight 47, thus raising the said weight and the weighted end of the lever 44, lifting the rod 48 and tilting the controlling-tube 32, thus bringing the stud 31 out of engagement with the arm 29 and permitting the weight 30 to close the door 26. This operation can be repeated as often as necessary, and in weighing it will be noticed that the weight 46 can be made to counterbalance the mercury in the tube.

Referring to Fig. 1, it will be seen that on each side of the scale there is a funnel 51, which is supported in a suitable collar 52, (see Fig. 3,) and this is bolted or otherwise fastened to a bracket-plate 53, which has a cushion or gasket 54 around the neck of the funnel, against which cushion the top of the bottle 55 or other package is brought, as hereinafter described. As a matter of convenience I provide a shelf 56 and partition 57 adjacent to the funnels and the bottle-holding apparatus, on which shelf bottles, trays, &c., can be piled to facilitate the work.

The snuff or other material to be packed is forced downward through the funnel by a hammer 58, which has an enlarged head 59, this hammer being made to reciprocate up and down in the bottom part of the funnel, and thus the material is packed snugly into the receptacle 55. The hammer is carried on the end of a hammer-rod 60 and, as shown in Fig. 3, the parts 58 and 60 are separable, but, if desired, they may be in a single piece. Each hammer-rod 60 reciprocates through suitable guide-collars 61 and 61$^a$ (see Fig. 1) and the collars are supported in a bracket-arm 62 on the main frame 10. The hammer-rod is reciprocated vertically by means of the tilting lever 63, which is fulcrumed, as shown at 64, on a suitable hanger 65, and, as shown in Fig. 2, the lever is perforated to provide for shifting the fulcrum and so change the stroke of the hammer. The outer end of each lever 63 is pivoted to a rod 66, which at its lower end is fastened to an eccentric-strap 67, and this is carried by an eccentric 68 on the driving-shaft 64. The two eccentrics 68 are arranged so that when one is up the other is down, and consequently this arrangement follows with respect to the two hammers 58, each reciprocating at the same speed as the other; but they alternate in their strokes. This enables the attendant to care for the bottles or packages placed beneath the two funnels 51. This means of reciprocating the hammers I find a convenient and practical one, but I do not limit the invention to this precise arrangement.

In packing snuff or other more or less sticky substance the tendency is for the material to stick against the wall of the funnel 51. To obviate this, I provide a scraper, (shown best in Figs. 3 and 4,) which is adapted to move downward close against the funnel-wall and scrape the material therefrom. As shown, the scraper comprises a ring 69, encircling the hammer 58, a cross-brace 70, connecting the ring to the hammer, and the depending blades 71 and 72, which are of unequal length and which are hung pivotally on the ring 70. It will be seen that on the upstroke of the hammer the scraper-blades hang loosely, but on the downstroke they fly outward against the wall of the funnel and as they move downward scrape off the material which would otherwise adhere.

Beneath each funnel 51 is a little table 73, which is carried by a vertically-reciprocating support 74, which slides through suitable guide-collars 75, these being supported in bracket-plates 76. Each support or rod 74 is preferably screw-threaded at the lower end, as shown at 77 in Fig. 2, and provided with a nut 78, carrying a cushion or buffer 79, so that when the rod is at the limit of its upstroke it may not be too abruptly stopped. The cushion 79 abuts, when the rod is at the limit of its stroke, with the lower bracket-plate 76.

Each rod 74 is pivoted to an arm 80, and this connects by a pivotal link 81 with a head 82 of a hanger 83, which is suitably supported on the frame 10, and the arm 80 is provided with weights 84 and 85, which are adjustable and which are adapted to hold the table 73 in a normally elevated position, or at least will so hold it when the table is pushed up in the position shown at the right hand in Fig. 1.

In operating the machine the weight 47 is adjusted so as to counterbalance the right quantity of snuff to be put into a package and the hopper 11 is kept sufficiently full of the material. This material is constantly moved toward the center of the hopper by the conveyer 14, from which it is dropped in the manner already described to the scale 40, and each time a charge is dropped the scale operates, as clearly set forth above, to close the door 26. The attendant then lifts the pan from the scale and tips the material into one of the funnels 51, beneath which funnel will be the bottle 55, which has already been placed there by the attendant, who has also lifted the table 73. The bottle is quickly filled by the reciprocation of the hammer 58 and its scraper, and while this filling is going on the operator places a bottle on the second table 73 and brings this up to position. The filling of two bottles can then go on at the same time, and the attendant alternately pours the snuff from the scale into the funnels and removes the bottles as fast as they are filled.

If large packages are to be filled with the snuff or other material, the device shown in Fig. 8 may be used in connection with the rod 74, so that an even resistance may be imparted to the rod as the rod is gradually depressed under the influence of the hammer 58. To this end a cylinder 87, which may be filled with glycerin or other similar liquid, is placed beneath the lower end of the rod 74, and the rod where it enters the cylinder is provided with a piston 88. The upper and lower parts of the cylinder communicate on one side through a pipe 89 and a valve $89^a$, by which the flow may be controlled, and on the other side by a pipe 90, in which is a check 91. As the piston 88 is depressed it forces the liquid up through the pipe 89 and valve $89^a$ to a point above the piston, and when the piston is raised again the liquid passes again below the piston through the pipe 90. This arrangement, it will be seen, steadies the rod 74 and adapts it to the use described.

Having thus described my invention, what I claim as new, and desire to secure by Letters Patent, is—

1. A machine of the kind described, comprising a trough-like hopper having a discharge-opening in the bottom, a normally closed door for the discharge-opening, a tilting arm connected to the door so that when moved in one direction it will open the door, a weighing-scale having its pan arranged beneath the discharge-opening, a tilting liquid-containing controller pivotally supported between the scale and the hopper, means by which one end of the controller may engage the tilting arm and open the door, and a rod pivotally connecting the opposite end of the controller with the scale-beam by which arrangement the descent of the scale-pan causes the controller to be tilted and permits the door to close, and the ascent of the scale-pan moves the controller so as to open the door.

2. An apparatus of the kind described, comprising a trough-like hopper having a discharge-opening in the bottom, a swinging counterbalanced door to normally close the said opening, a depending curved arm connected to the door so that when raised it will open the door, a scale arranged with its pan beneath the discharge-opening of the hopper, a tilting controller between the hopper and scale, said controller having at one end means for striking the curved arm to open the door, and a rod connecting the opposite end of the controller to the scale-beam.

In testimony whereof I have signed my name to this specification in the presence of two subscribing witnesses.

CHARLES OSCAR ERICSON.

Witnesses:
JOHN T. HYSORE,
CARL G. DOMALDER.